(12) United States Patent
Contreras et al.

(10) Patent No.: US 8,824,091 B2
(45) Date of Patent: Sep. 2, 2014

(54) MEDIA TOPOGRAPHY DRIVEN FLYING HEIGHT MODULATION SENSING USING EMBEDDED CONTACT SENSOR

(71) Applicant: HGST Netherlands B.V., Amsterdam (NL)

(72) Inventors: John Contreras, Palo Alto, CA (US);
Saurabh Deoras, Milpitas, CA (US);
Samir Garzon, Sunnyvale, CA (US);
Kenichi Kuramoto, Fujisawa (JP);
Remmelt Pit, Menlo Park, CA (US)

(73) Assignee: HGST Netherlands B.V., Amsterdam (NL)

( * ) Notice: Subject to any disclaimer, the term of this patent is extended or adjusted under 35 U.S.C. 154(b) by 10 days.

(21) Appl. No.: 13/722,935

(22) Filed: Dec. 20, 2012

(65) Prior Publication Data

US 2014/0177090 A1 Jun. 26, 2014

(51) Int. Cl.
*G11B 21/02* (2006.01)
*G11B 5/02* (2006.01)

(52) U.S. Cl.
USPC .............................................. 360/75; 360/25

(58) Field of Classification Search
None
See application file for complete search history.

(56) References Cited

U.S. PATENT DOCUMENTS

| | | | |
|---|---|---|---|
| 7,405,896 B2 | 7/2008 | Hirano et al. | |
| 7,508,618 B1 | 3/2009 | Herbst et al. | |
| 7,697,223 B2 | 4/2010 | Eaton et al. | |
| 7,800,858 B1 | 9/2010 | Bajikar et al. | |
| 7,839,595 B1 * | 11/2010 | Chue et al. | 360/75 |
| 2003/0011915 A1 * | 1/2003 | Riddering et al. | 360/25 |
| 2003/0204347 A1 * | 10/2003 | Smith | 702/82 |
| 2009/0262458 A1 | 10/2009 | Shen et al. | |
| 2011/0157736 A1 * | 6/2011 | Contreras et al. | 360/29 |
| 2012/0099218 A1 | 4/2012 | Kurita et al. | |
| 2012/0120521 A1 | 5/2012 | Kurita et al. | |

OTHER PUBLICATIONS

B. H. Thornton et al., "The effects of disk morphology on flying-height modulation: experiment and simulation", IEEE Transactions on Magnetics, Jan. 2002, pp. 107-111, vol. 38 Issue 1, IEEE.
J. Xu et al., "Drive level measurement of flying height modulation and control of slider disk contact", Tribology Letters, Oct. 27, 2006, pp. 159-162, vol. 24 No. 2, Springer.

* cited by examiner

*Primary Examiner* — Andrew L Sniezek
(74) *Attorney, Agent, or Firm* — John D. Henkhaus

(57) ABSTRACT

Approaches for a flying height control scheme in a hard-disk drive (HDD) device. The flying height control scheme utilizes an embedded contact sensor (ECS) to characterize the topography of a magnetic-recording disk at various flying heights of a head slider over a corresponding disk. A relation between a particular flying height and a corresponding ECS value which characterizes the media topography at that particular flying height is represented in disk topography data. The disk topography data is accessed and used for active flying height control for the head-disk interface in view of the current ECS value.

18 Claims, 6 Drawing Sheets

---

ACCESS DISK TOPOGRAPHY DATA WHICH REPRESENTS A RELATION BETWEEN A PARTICULAR FLYING HEIGHT AND AN ECS VALUE WHICH CHARACTERIZES THE TOPOGRAPHY OF THE MAGNETIC-RECORDING DISK — 502

SUBSTANTIALLY MAINTAIN THE PARTICULAR FLYING HEIGHT BASED ON THE DISK TOPOGRAPHY DATA AND ON AN ECS SIGNAL CORRESPONDING TO THE CURRENT FLYING HEIGHT OF THE HEAD SLIDER — 504

US 8,824,091 B2

MEDIA TOPOGRAPHY DRIVEN FLYING HEIGHT MODULATION SENSING USING EMBEDDED CONTACT SENSOR

FIELD OF THE INVENTION

Embodiments of the invention relate to flying height modulation sensing and control based on an embedded contact sensor (ECS) for use in a hard-disk drive (HDD).

BACKGROUND

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head, which is housed in a slider, and the surface of a magnetic-recording disk must be tightly controlled. An actuator relies in part on a suspension's force on the slider and on the aerodynamic characteristics of the slider air bearing surface (ABS) to provide the proper distance between the read/write head and the surface of the magnetic-recording disk (the "flying height") while the magnetic-recording disk rotates. A slider therefore is said to "fly" over the surface of the magnetic-recording disk.

Resistor temperature detector (RTD) systems have been used in the prior art to determine when the slider head makes physical contact with the magnetic-recording disk based upon the temperature of an element, such as an embedded contact sensor (ECS), embedded in the slider near the read/write head. ECS elements sense physical contact of the slider with the disk based on the ECS element's resistance, e.g., the amount of voltage across the element, which is affected by the temperature change caused by such physical contact.

Thermal flying height control (TFC) systems have been used in the prior art to fly the read/write head as close as possible to the magnetic-recording disk for effective operation of the head. Typically, TFC systems gently urge the head area of the slider toward the disk until contact is made ("touchdown") at which point the slider is urged away from the disk ("pull-back"). Touchdown and pull-back are effectuated by, respectively, providing electrical current to a heater element which causes the surrounding slider materials to expand and therefore protrude outward closer to the disk and then slightly reducing the current to the heater element to cause the surrounding slider materials to consequently contract away from the direction of the disk. In HDD systems having an ECS, the ECS is often used to sense the touchdown event, as described.

However, in prior art approaches no mechanism for flying height sensing during the HDD lifetime is used, but only pre-calculated corrections to the TFC settings are applied due to temperature or pressure changes.

SUMMARY OF EMBODIMENTS OF THE INVENTION

Embodiments of the invention are directed towards a flying height control scheme in a hard-disk drive (HDD) or a hybrid drive storage device. The flying height control scheme utilizes an embedded contact sensor (ECS) to characterize the microwaviness of a magnetic-recording disk at various flying heights of a head slider over the corresponding disk. A relation between a particular flying height and a corresponding ECS value which characterizes the media topography at that particular flying height is represented in disk topography data. Indeed, relations between multiple flying heights and their corresponding ECS values characterizing the media topography at each respective flying height may be represented in the disk topography data. In the described scheme, the disk topography data is accessed and used for active flying height control for the head-disk interface in view of the current ECS value.

In embodiments, controlling the flying height of the head slider over the disk may be implemented using a thermal flying height control (TFC) system and/or an interface voltage control (IVC) system within the drive. As such, embodiments can operate in a feedback loop for TFC and IVC systems. The type of sensing scheme described may be used during manufacturing, for example to measure the writer induced protrusion or to sense flying height variations for feed-forward TFC, and also for continuous flying height monitoring at the HDD level.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a flying height modulation and control system using an embedded contact sensor (ECS) and based on the media topography, for use in a head disk interface system of a hard-disk drive (HDD), are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

PHYSICAL DESCRIPTION OF ILLUSTRATIVE EMBODIMENTS OF THE INVENTION

Figure 1:
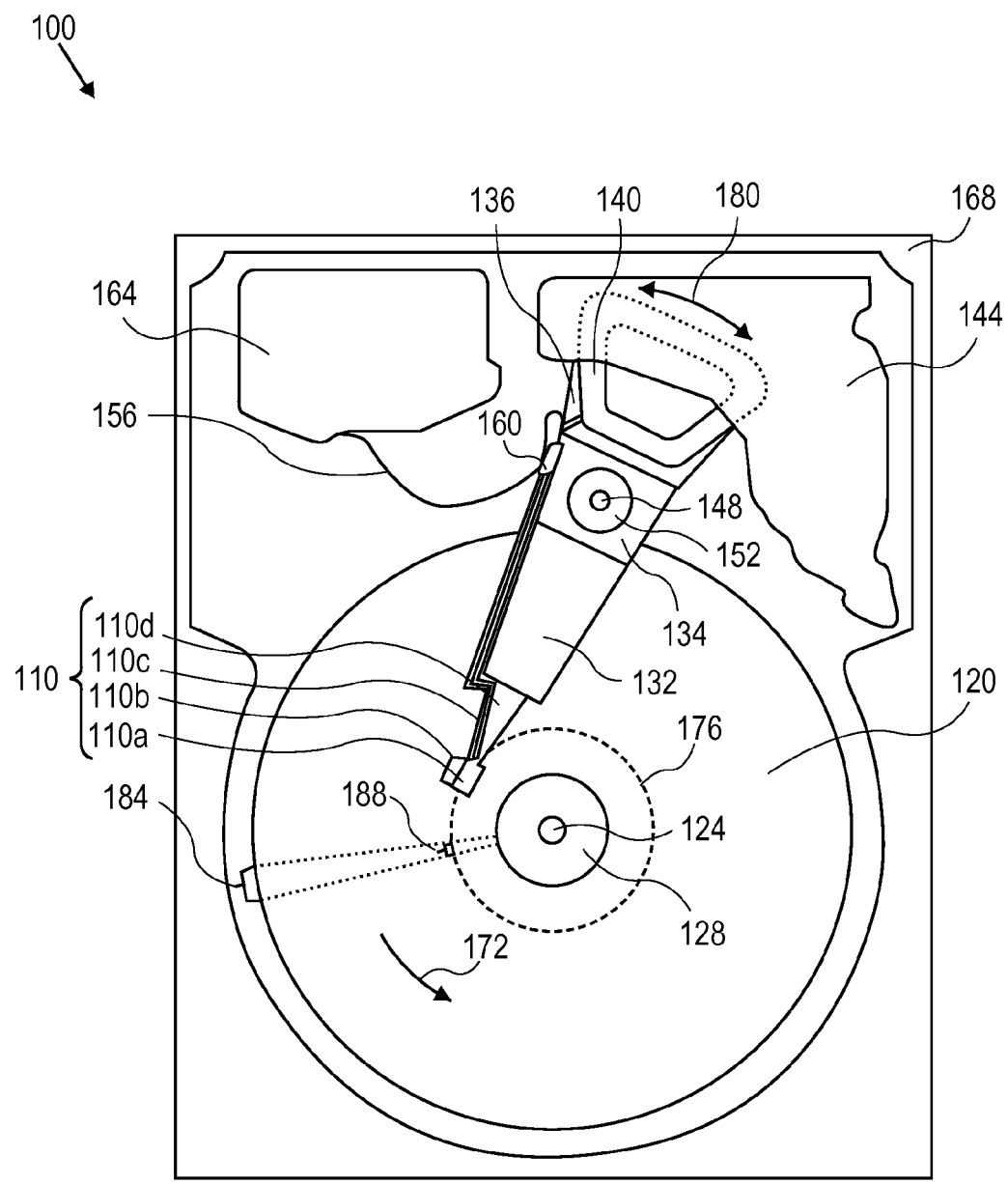
FIG. 1 is a plan view of an HDD, according to an embodiment of the invention.

Embodiments of the invention may be used to continuously monitor and control the flying height of a head slider over a magnetic-recording disk incorporated with a hard-disk drive (HDD). In accordance with an embodiment of the invention, a plan view of a HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown). The armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the head 110a, are provided by a flexible cable 156. Interconnection between the flexible cable 156 and the head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a.

Figure 2:
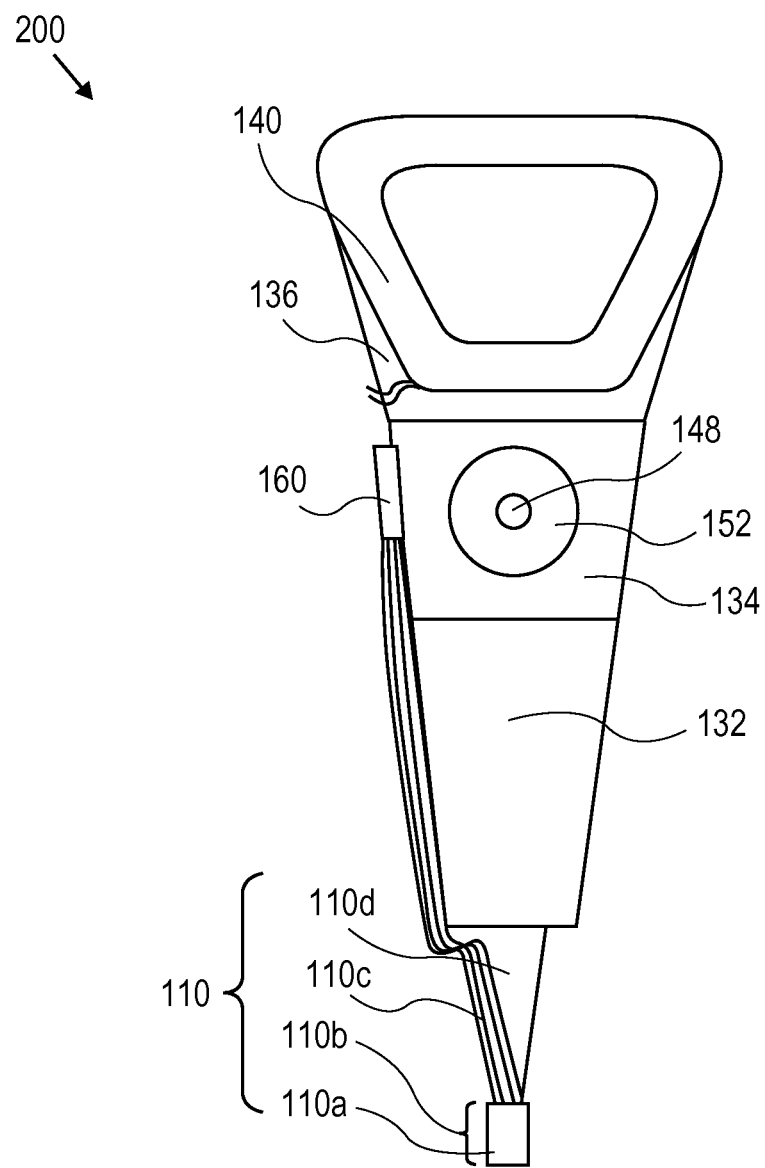
FIG. 2 is a plan view of a head-arm-assembly (HAA), according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Figure 3:
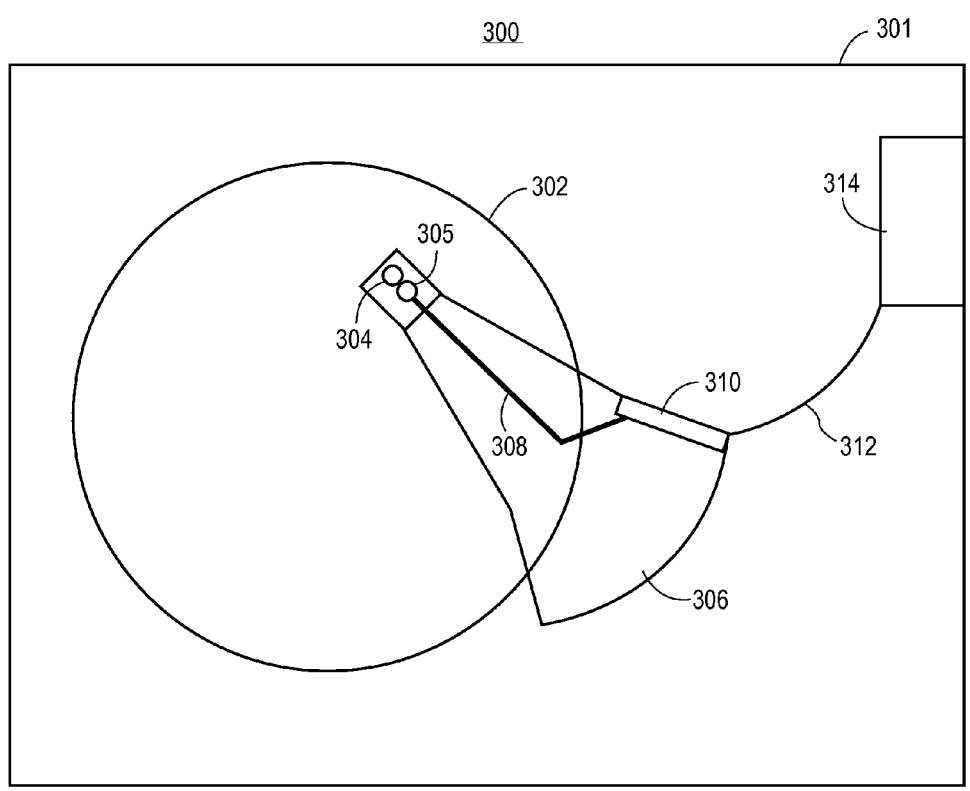
FIG. 3 is an illustration of a read/write circuit within an HDD, according to an embodiment of the invention.

FIG. 3 is an illustration of a read/write circuit 310 within an HDD according to an embodiment of the invention. FIG. 3 depicts hard-disk drive (HDD) 300 which includes enclosure 301 that contains one or more magnetic platters or disks 302, read elements 304, write elements 305, an actuator arm suspension 306, a transmission line interconnect 308, a read/write integrated circuit (IC) 310, a flexible interconnect cable 312, and a disk enclosure connector 314.

Electrical signals are communicated between the read/write elements and read/write integrated circuit 310 over transmission line interconnect 308. Read/write integrated circuit 310 conditions the electrical signals so that they can drive write element 305 during writing and amplifies the electrical signal from read element 304 during reading. Signals are communicated between read/write integrated circuit 310 and disk enclosure connector 314 over flexible cable 312. Disk enclosure connector 314 conducts signals with circuitry external to disk enclosure 301. In other embodiments, read/write integrated circuit (IC) 310 is located elsewhere than depicted in FIG. 3, such as on flex cable 312 or on printed circuit board (PCB) within the hard-disk drive.

Introduction

Even though the head slider flying height is critical during write and read operations, the flying height modulation is not currently monitored at the HDD level in prior HDD implementations. Furthermore, the writer induced protrusion is not measured at the HDD level in prior HDD implementations, rather such protrusion is calculated based on an empirical formula calibrated using bench level measurements.

Based on the foregoing, embodiments of the invention are described which utilize the significant sensitivity of the embedded contact sensor (ECS) to media/substrate topography as a measure of the head/disk interface (HDI) spacing fluctuation, applicable during both read and write operations. Thus, embodiments allow not only continuous monitoring of the flying height modulation but embodiments also allow measurement of the writer induced protrusion without the need for repeated touchdowns or an empirical formula.

An ECS is a metallic strip located at the slider 110b ABS and typically in close proximity to the writer. The resistance of the ECS changes in response to temperature changes and can be used to determine touchdown, when the slider 110b temperature suddenly increases due to frictional heating with the disk 120, and to map disk 120 features such as asperities and pits according to an embodiment of the invention. Because the slider 110b does not exactly track the disk 120 topography, the distance between the ECS and the disk 120 is not constant. Because cooling of the slider 110b due to heat dissipation to the disk 120 depends on the HDI spacing, miscompliance (spacing changes) between the slider 110b and the disk 120 leads to temperature changes in the ECS, which are discernible as fluctuations in the ECS resistance. When the slider 110b flies over a disk 120 protrusion then the slider 110b heat dissipates more via thermal transfer to the disk 120 and the ECS resistance reflects the resultant decrease in temperature. Similarly, when the slider 110b flies over a disk 120 depression then the slider 110b heat dissipates less via thermal transfer to the disk 120 and the ECS resistance reflects the resultant increase in temperature. Thus, such temperature changes reflect the disk topography, i.e., the "roughness" of the disk.

Generating Disk Topography Data

Figure 4:
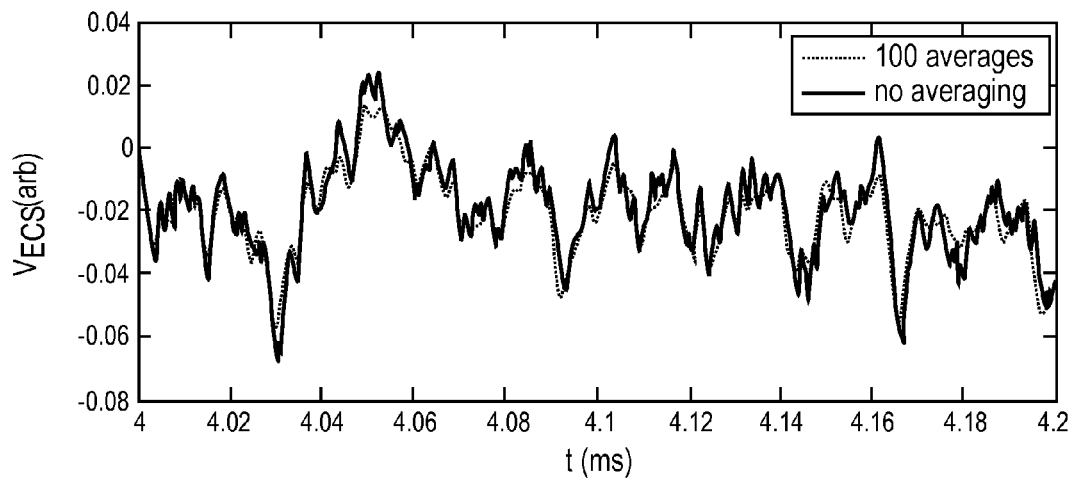
FIG. 4 is an illustration of an ECS signal over a few sectors of a magnetic-recording medium at a particular flying height, according to an embodiment of the invention.

FIG. 4 is an illustration of an ECS signal 400 over a few sectors of a magnetic-recording medium at a particular flying height, around 8 nm, according to an embodiment of the invention. FIG. 4 illustrates the variable "time" along the x-axis (the abscissa) and the variable $V_{ECS}$ (voltage differential across the embedded contact sensor) along the y-axis (the ordinate). The data of FIG. 4 suggests that no averaging is required to observe the head to disk miscompliance because the ECS typically has a sufficient enough signal to noise ratio. The media roughness observed in FIG. 4 is typical for state of the art disks and corresponds to root mean square variations (10-100 microns) less than 0.2 nm.

Using a flying height sensor based on disk roughness-induced ECS fluctuations is based on the notion that the root mean square of the ECS fluctuations increases monotonically as the slider gets closer to the disk. Because the sensitivity of the ECS to miscompliance is dominated by head/disk cooling, a strong function of head/disk spacing, the size of the topography-related fluctuations are well correlated with the flying height. By measuring the average size of the disk roughness features as seen by the ECS, and by calibrating head/disk spacing to disk roughness using, for example, Wallace-type measurements as known in the art, continuously monitoring the flying height during both read and write operations is enabled. Furthermore, continuous control of the flying height is achievable by defining a particular flying height by a given ECS roughness value (corresponding to a fixed root mean square of $V_{ECS}$) and using a flying height control feedback loop such as a TFC system and/or an IVC system to maintain constant the average ECS-measured roughness value (root mean squared of $V_{ECS}$) by varying the head/disk spacing.

Once the disk roughness as seen by the ECS is measured and the head/disk spacing to disk roughness is calibrated, disk topography data is thereby generated. According to an embodiment, the disk topography data represents a relation between a particular flying height and an ECS value which characterizes the topography of the magnetic-recording disk. For example, if the signal 400 of FIG. 4 represents the ECS signal while flying at an 8 nm flying height over a portion of the disk 120, then the root mean square of the $V_{ECS}$ signal 400 is related to the 8 nm flying height as disk topography data. According to an embodiment, this disk topography data is then stored within the hard-disk drive, such as in an area of disk reserved for operational data rather than for user data, or in ROM or any other form of non-volatile memory within the HDD, such as in memory associated with the preamplifier circuitry or in memory associated with the read-channel and/or write-channel circuitry.

Substantially Maintaining the Slider Flying Height

Once stored, the disk topography data is available for access and use in actively controlling and substantially maintaining the head slider flying height. Maintaining a precise target flying height accurately and constantly within an HDD is not really practical due to the many dynamic variables and effects that influence a head slider's flying height at any given time during operation of the HDD. Thus, in this context the flying height is said to be "substantially maintained" due to such practical limitations and to reflect the inherent dynamic character of an operating HDD and the consequent inability to fly a slider 110b over a disk 120 with constant and ultimate precision.

One approach to maintaining the head slider flying height based on the disk topography data is to drive a TFC system based on the disk topography data and the current ECS value. The TFC heater enables the control of the read/write element protrusion relatively independently from the effect generated by the read/write elements during read or write operations. Preamplifier circuitry is typically utilized to supply the necessary current to the TFC heater. Thus, according to an embodiment, the preamplifier is configured to apply the changes to TFC heater current needed to affect the slider protrusion, and thus the head slider flying height, to maintain the desired flying height using the real-time ECS values as a flying height sensing or monitoring mechanism based on the previously derived disk topography data. With an alternative approach, the channel circuitry/processor can be used to process the ECS data and send back a signal to the preamplifier for adjusting the TFC heater, because the channel is more powerful and thus better able to handle many more operations than the preamplifier.

Another approach to maintaining the head slider flying height based on the disk topography data is to utilize the described flying height control scheme to provide a feedback parameter to an HDD interface voltage control (IVC) system based on the disk topography data and the current ECS value. IVC (interface voltage control) is used to apply a voltage to the slider body in order to minimize the slider-disk potential differences. When the slider-disk potential is not cancelled completely, an attractive electrostatic force pulls the slider close to the disk. Therefore, IVC can be used to control the slider to disk spacing.

A Method for Active Flying Height Monitoring in an HDD

Figure 5:
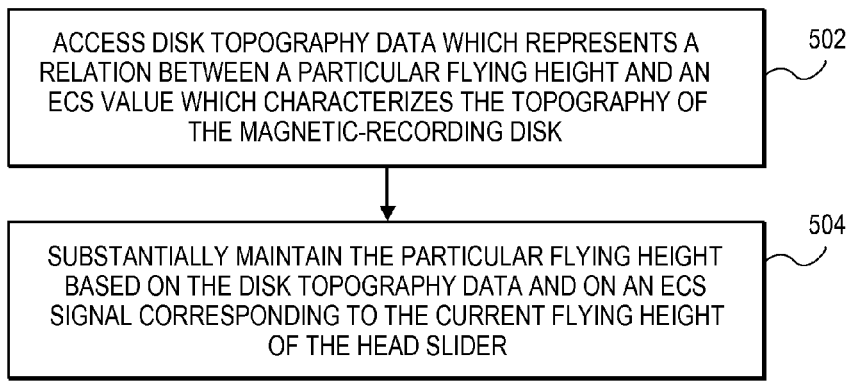
FIG. 5 is a flow diagram illustrating a method for active management of the slider-disk flying height in an HDD, according to an embodiment of the invention.

FIG. 5 is a flow diagram illustrating a method for active management of the slider-disk flying height in an HDD, according to an embodiment of the invention. The method depicted in FIG. 5 may be implemented for operation by, for non-limiting examples, an HDD preamplifier, hard disk controller electronics, read-channel electronics, write-channel electronics, and the like. The method logic may be implemented as firmware or in hardware circuitry, as non-limiting examples.

At step 502, disk topography data is accessed which represents a relation between a particular flying height and an ECS value which characterizes the topography of the magnetic-recording disk, such as disk 120 (FIG. 1). According to an embodiment, the ECS value that is used to represent a particular flying height is the root mean square of the ECS signal over some time interval. The disk topography data may be accessed from within the HDD (such as HDD 100 of FIG. 1) or from outside of the HDD. However, according to an embodiment, the disk topography data is accessed from storage within memory configured in the HDD. For example, the disk topography data may be stored in and accessed from AE module 160 (FIG. 1) or other internal electronic components.

At step 504, the particular flying height is substantially maintained based on the disk topography data and on the current ECS value corresponding to the current flying height of the head slider. Similarly, according to an embodiment the root mean square of the ECS signal is used as the current ECS value. For example, if a target flying height for a given head-disk interface is 4 nm and the current ECS value, such as the root mean square of the voltage differential across the ECS element or the resistance of the ECS element, correlates in the disk topography data to a disk topography profile that corresponds to a flying height of 6 nm (i.e., the ECS value is indicating a higher temperature than expected for the 4 nm flying height), then action needs to be taken to lower the head slider closer to the disk. As described, either the TFC system or the IVC system within the HDD may then be triggered to perform an action to lower the flying height, as known in the art.

The method illustrated in FIG. 5 can be implemented to operate repeatedly, on a continuous or periodic basis as desired. For a non-limiting example, the method may be used for periodic corrections of the TFC settings, including sector-dependent TFC and in-situ protrusion recalibration. One advantage of the method is that it is largely independent from heating sources and, therefore, can be used during write and read operations.

Periodically, or on demand, the ECS value can be measured during read at each sector to recalibrate the feed forward TFC coefficients, which can be implemented using a slow feedback routine where TFC settings are modified proportionally to the difference between the measured and expected ECS value until this difference reaches a threshold value. Alternatively, pre-calibrations can be used to adjust TFC based on the mentioned difference between measured and stored ECS values.

Generally, using the ECS signal as a measure of disk roughness and flying height, and either TFC or IVC as flying height actuators, a feedback loop can be used to maintain a substantially constant flying height at any moment. This includes, for example, (1) during read/write transitions, where there is usually a flying height change due to the different time constants of the TFC and the writer; (2) around a full disk revolution, where low frequency variations in the disk curvature due to clamping affect the flying height; (3) under any thermal load from the writer or additional features such as a thermal-assisted recording (TAR) thermal element; and (4) under any atmospheric conditions such as temperature, humidity and pressure.

Writer Induced Protrusion

According to an embodiment, the described scheme of characterizing the disk roughness or microwaviness utilizing an ECS signal at a given head slider flying height, is used to measure the "write-induced pole-tip-protrusion" (WPTP). During a write operation in an HDD, current flows to the coil of the read/write head and this current generates heat which causes thermal expansion of the write element pole tip. This expansion in turn reduces the mechanical spacing between the head slider and the disk, i.e., it reduces the flying height. WPTP is understood to be a function of the write-signal frequency and the write duration of the head. The magnitude of WPTP is typically on the order of nanometers which can reduce the head-disk interface clearance dramatically, which can cause write modulation and altitude failure, for example, or even cause undesirable slider-disk contact. Thus, write-induced pole-tip-protrusion compensation is a critical factor for reliable HDD operation.

According to an embodiment, the disk topography is measured using the ECS, for a TFC value that results in the desired flying height during a read operation when there is no extra head protrusion due to writer heating, i.e., no WPTP. Then the write current is set to a small specified value and the TFC is adjusted until the disk topography measured with the ECS is equal to the original read value. The previous step is performed for a series of increasing currents to generate a plot as illustrated as an example in FIG. 6.

Figure 6:
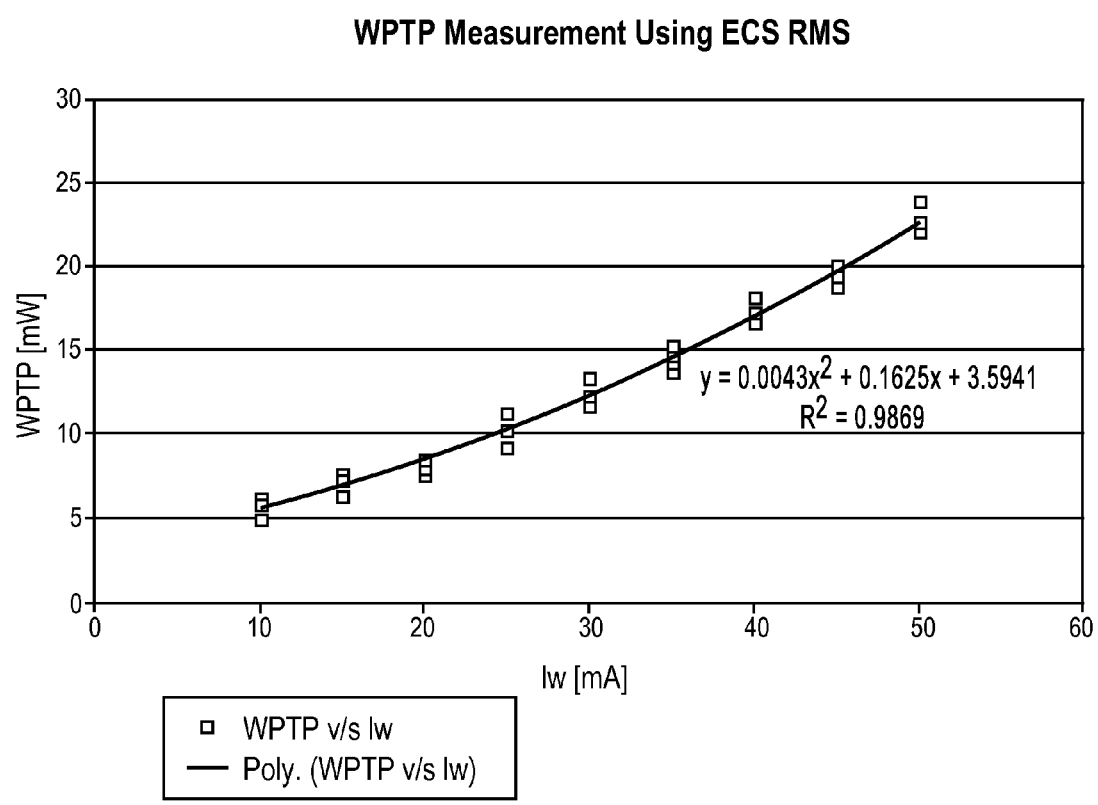
FIG. 6 is a graph illustrating an example WPTP compensation regime, in mW as a function of write current, according to an embodiment of the invention.

FIG. 6 is a graph illustrating an example WPTP compensation regime, in mW as a function of write current, according to an embodiment of the invention. Thus, the graph of FIG. 6 illustrates an example of how much WPTP one might need to compensate for at given values of write current, where the data is generated using the relation between ECS values and the corresponding disk topography at a given flying height.

Figure 7:
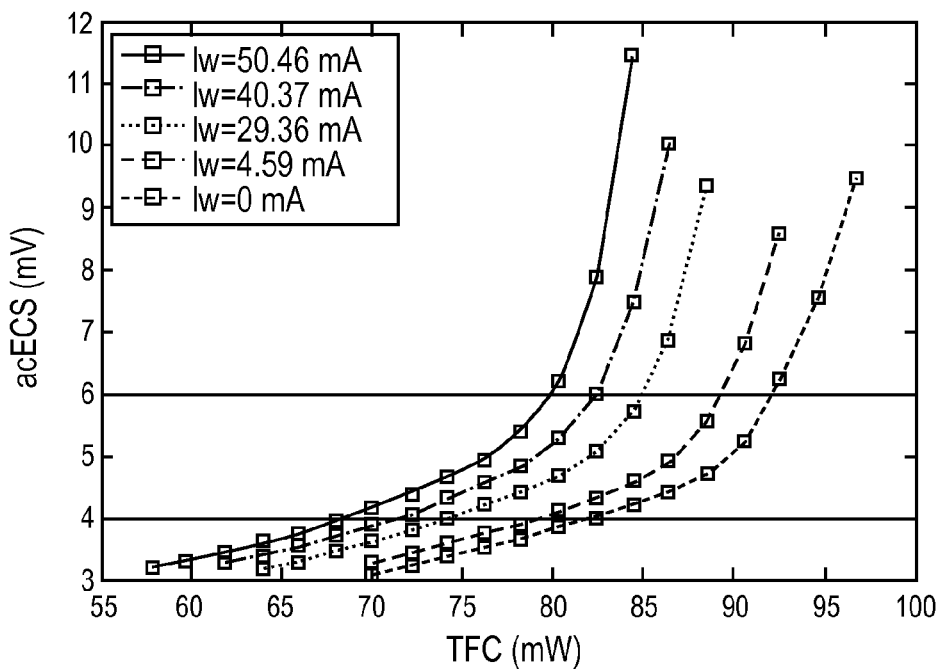
FIG. 7 is a graph illustrating a first example relation between measured ECS values as a function of TFC and write current, according to an embodiment of the invention.
Figure 8:
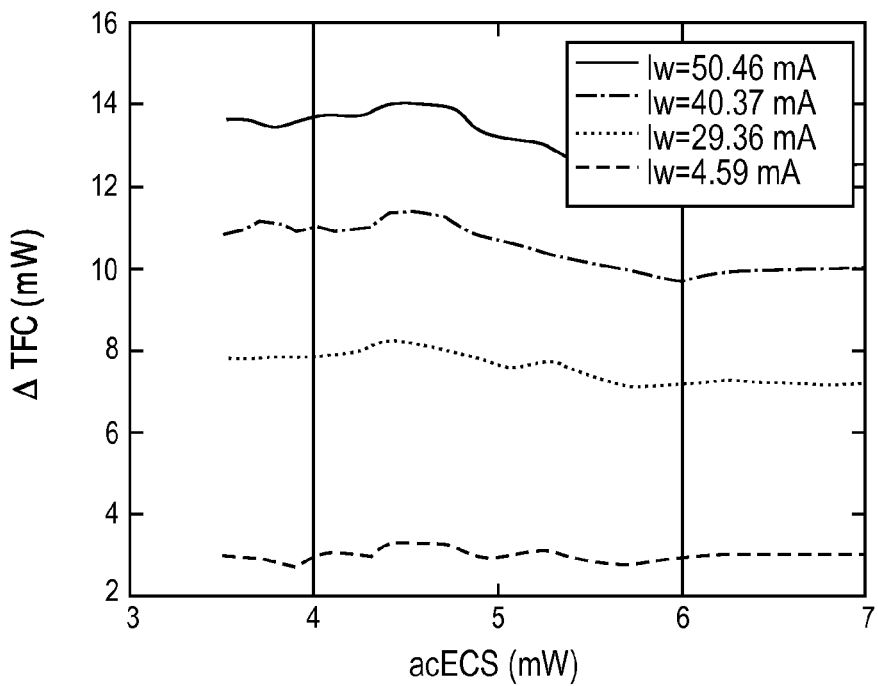
FIG. 8 is a graph illustrating a second example relation between measured ECS values as a function of TFC and write current, according to an embodiment of the invention.

FIG. 7 is a graph illustrating a first example relation between measured ECS values as a function of TFC and write current, according to an embodiment of the invention. FIG. 8 is a graph illustrating a second example relation between measured ECS values as a function of TFC and write current, according to an embodiment of the invention. FIGS. 7 and 8 illustrate examples of the type of data one might generate using the relation between ECS values and the corresponding disk topography, as a function of the typically known parameter, $I_w$, write current. Such data can be implemented to calibrate or drive WPTP compensation schemes within a HDD.

Similarly, the write TFC value can be recalibrated periodically or on demand by slowly increasing the write current while at the same time keeping the ECS value constant (see the lower horizontal line of FIG. 7 which represents the target ECS value). Thus, at any value of the writer current it is feasible to adjust the TFC until the ECS value is within a certain tolerance of the desired value.

The foregoing examples describe a limited number of example uses of the ECS as a head-disk interface monitoring sensor based on the micro-topography of the disk. Other uses of the ECS as a head-disk interface monitoring sensor based on the topography of the disk are contemplated and may fall within the scope of the claims as appended hereto.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
   a head slider comprising an embedded contact sensor (ECS) and a flying height control heater;
   a magnetic-recording disk rotatably mounted on a spindle;
   a voice coil motor configured to move the head slider to access portions of the magnetic-recording disk; and
   an electronic component configured to control the flying height between the head slider and the magnetic-recording disk, the electronic component configured for:
     accessing disk topography data that represents, for a particular defined flying height, a corresponding ECS-based disk roughness value which characterizes the topography of the magnetic-recording disk, and
     substantially maintaining the particular flying height based on the disk topography data and an ECS signal corresponding to the current flying height.

2. The hard-disk drive of claim 1,
   wherein maintaining the particular flying height comprises controlling the electrical current to the flying height control heater.

3. The hard-disk drive of claim 1,
   wherein maintaining the particular flying height comprises providing a feedback parameter to an interface voltage control (IVC) system.

4. The hard-disk drive of claim 1,
   wherein maintaining the particular flying height includes compensating for the write-induced pole-tip-protrusion associated with the head slider.

5. The hard-disk drive of claim 1,
   wherein maintaining the particular flying height comprises actively maintaining the particular flying height during field operation of the hard-disk drive.

6. The hard-disk drive of claim 1, further comprising:
   deriving the disk topography data from an ECS signal generated while flying the head slider over a portion of the magnetic-recording disk, and
   storing the disk topography data in the hard-disk drive.

7. The hard-disk drive of claim 6,
   wherein deriving the disk topography data includes characterizing the microwaviness of the surface of the magnetic-recording disk.

8. The hard-disk drive of claim 1,
   wherein maintaining the particular flying height comprises maintaining the particular flying height without intentionally contacting the head slider with the magnetic-recording disk.

9. The hard-disk drive of claim 1,
   wherein the ECS-based disk roughness value which characterizes the topography of the magnetic-recording disk is the root mean square of an ECS signal generated while flying the head slider over a portion of the magnetic-recording disk at a particular defined flying height.

10. A method for active flying height management in a hard-disk drive comprising a head slider having an embedded contact sensor (ECS), a magnetic-recording disk rotatably mounted on a spindle, a voice coil motor configured to move the head slider to access portions of the magnetic-recording disk, and an electronic component for controlling the flying height of the slider over the magnetic-recording disk, the method comprising:
    accessing disk topography data that represents, for a particular defined flying height, a corresponding ECS-based disk roughness value which characterizes the topography of the magnetic-recording disk, and
    substantially maintaining the particular flying height based on the disk topography data and an ECS signal corresponding to the current flying height.

11. The method of claim 10,
    wherein substantially maintaining the particular flying height comprises controlling the electrical current to a flying height control heater embedded in the head slider.

12. The method of claim 10,
    wherein substantially maintaining the particular flying height comprises providing a feedback parameter to an interface voltage control (IVC) sub-system in the hard-disk drive.

13. The method of claim 10,
    wherein maintaining the particular flying height includes compensating for the write-induced pole-tip-protrusion associated with the head slider.

14. The method of claim 10,
    wherein substantially maintaining the particular flying height comprises continuously maintaining the particular flying height during field operation of the hard-disk drive.

15. The method of claim 10, further comprising:
    deriving the disk topography data from an ECS signal generated while flying the head slider over a portion of the magnetic-recording disk, and
    storing the disk topography data in the hard-disk drive.

16. The method of claim 15,
    wherein deriving the disk topography data includes characterizing the microwaviness of the surface of the magnetic-recording disk.

17. The method of claim 10,
    wherein maintaining the particular flying height comprises maintaining the particular flying height without intentionally contacting the head slider with the magnetic-recording disk.

18. The method of claim 10,
    wherein the ECS-based disk roughness value which characterizes the topography of the magnetic-recording disk is the root mean square of an ECS signal generated while flying the head slider over a portion of the magnetic-recording disk at a particular defined flying height.

* * * * *